(12) United States Patent
Meier

(10) Patent No.: US 6,430,107 B1
(45) Date of Patent: Aug. 6, 2002

(54) COMPUTERIZED AUDITORY SCENE ANALYSIS PARTICULARLY SUITED FOR UNDERSEA APPLICATIONS

(75) Inventor: Lewis Meier, Niantic, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/968,395

(22) Filed: Oct. 1, 2001

(51) Int. Cl.[7] ............................................... H04B 11/00
(52) U.S. Cl. ...................................... 367/131; 367/124
(58) Field of Search ............................. 367/87, 88, 99, 367/118, 124, 131

(56) References Cited

U.S. PATENT DOCUMENTS 5,432,753 A * 7/1995 Maranda et al. ............ 367/124
5,488,589 A * 1/1996 DeAngelis ................... 367/131
5,502,688 A * 3/1996 Recchione et al. .......... 367/131
5,568,450 A * 10/1996 Grande et al. ............... 367/131

* cited by examiner

Primary Examiner—Ian J. Lobo
(74) Attorney, Agent, or Firm—Michael J. McGowan; Prithvi C. Lall; Michael F. Oglo

(57) ABSTRACT

A digital signal processor is disclosed for analyzing sound signals to determine the identification of the sound and the location of the source of the sound, as well as to present its results as an auditory scene. The processing includes producing a gram representative of a sound signal in time, frequency, and space parameters, and then extracting elements from the gram and features from the elements. The elements and the features are routed to an inference engine, which also receives predefined knowledge from a database. The inference engine derives conclusions, which are used to produce the auditory scene.

24 Claims, 5 Drawing Sheets

COMPUTERIZED AUDITORY SCENE ANALYSIS PARTICULARLY SUITED FOR UNDERSEA APPLICATIONS

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

Not applicable.

BACKGROUND OF THE INVENTION (1) Field of the Invention

The present invention relates to the detection of acoustic energy sources and, more particularly, to a signal processor particularly suited for use in a sonar system for analyzing acoustic energy to determine the identification and the location of the source of acoustic energy.

(2) Description of the Prior Art

Sonar is a system for detection and ranging by means of acoustic energy such as sonic and ultrasonic signals. It takes sound either passively emitted by or actively echoed off of takes sound either passively emitted by or actively echoed off of underwater objects and processes the sound by beam forming and signal processing to provide an auditory scene associated with the underwater objects.

The sonar systems are being continuously updated with improved transducers, sensors and communication links, all providing additional data requiring analysis by the sonar operator. The sonar operator is sometimes presented with a bewildering array of data, but still must make sense of the array in order to perform his/her function. Further improvements in the transducers, sensors and communication links will place a further burden on a sonar operator. It is desired that the sonar system be provided that provides a sonar operator with a comprehensive picture of the undersea environment, but at the same time eases the burden of the sonar operator to easily handle the associated data.

SUMMARY OF THE INVENTION

Accordingly, it is a general purpose and object of the present invention to provide for a digital processor particularly suited for use in sonar applications for analyzing acoustic energy to determine the identification and the location of the source of acoustic energy and to do so in a manner to ease the sonar operator's task.

The digital processor has five (5) stages. The first stage receives beam-formed acoustic energy. The second stage transforms the acoustic energy into a gram, which is representative of the acoustic energy and has time-frequency-space parameters. The third stage receives the gram and extracts elements from the gram and features from the elements. The fourth stage has knowledge supplied from a database defining predetermined elements, regions, and features. The fifth stage receives the elements and the features of the third stage and the supplied knowledge of the fourth stage and derives conclusions based on a comparison between the supplied knowledge and the elements and the features.

It is a further object of the present invention to partially automate the sonar-processing task so as to ease the burden of the operator.

It is a further object of the present invention to provide a signal processor that is easily adapted to further improvements of sensors, transducers, and communication links.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout the several views of the drawings and wherein.

DESCRIPTION OF THE PREFERRED EMBODIMENTS

Figure 1:
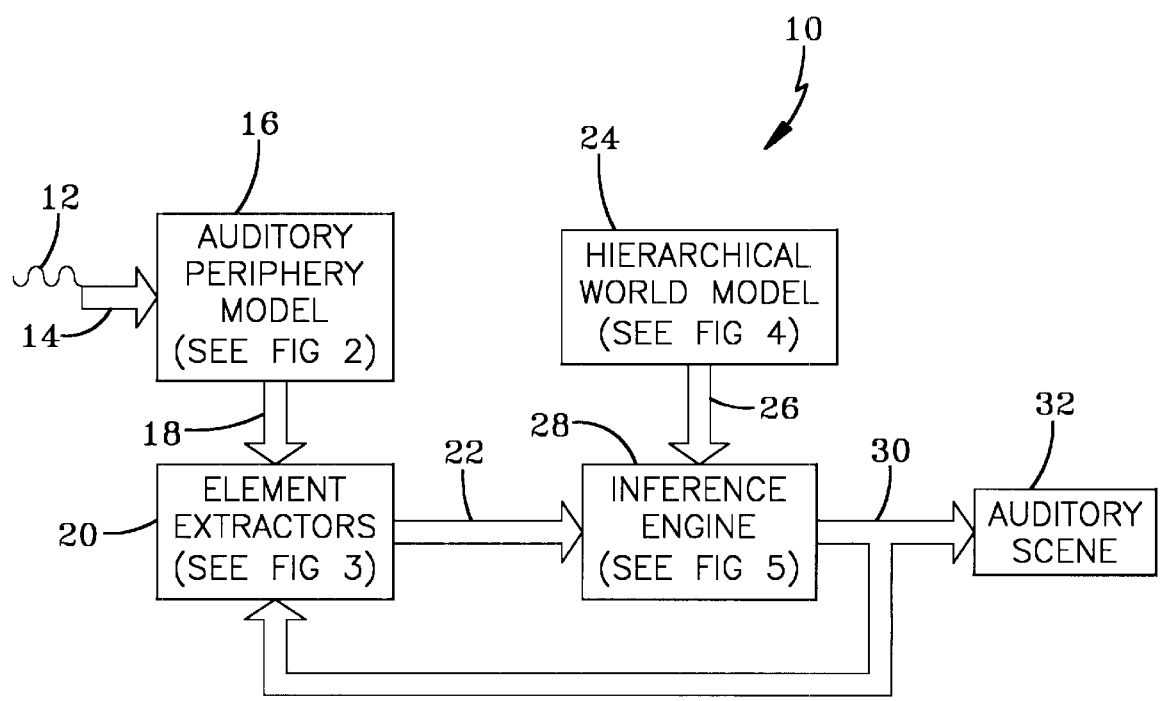
FIG. 1 is a block diagram of the present invention.

With reference to the drawings, there is shown in FIG. 1 a block diagram of digital processor 10 of the present invention used for analyzing acoustic energy 12 to determine the identification of the source of the acoustic energy 12.

The digital processor 10 of the present invention can be embodied in the form of computer-implemented processes and apparatuses for practicing those processes. The digital processor can also be embodied in the form of computer program code embodied in tangible media, such as floppy disks, CD-ROM's, hard drives or other computer-readable storage medium wherein, when the computer program is loaded into and executed by a computer, the computer becomes an apparatus for practicing the invention. The present invention can be embodied in the form of a computer program code, for example, whether stored on a storage medium, loaded into and/or executed by a computer, or transmitted over some medium, such as, electrical wiring or cabling, through fiber optics, or via electromagnetic radiation, wherein, when the computer program code is loaded into and executed by a computer, the computer becomes an apparatus for practicing the invention. When implemented on a general purpose microprocessor, the computer program code segments the microprocessor to create specific logic circuits.

The beam-formed acoustic energy 12 pertaining to audible sound, is routed on signal path 14 to the auditory peripheral model 16, which may serve as a first stage for receiving the beam-formed acoustic energy and has a second stage for transforming acoustic energy into a so called "gram", which is representative of the beam-formed acoustic energy and has time-frequency-space parameters The acoustic energy related to the present invention is sonic and ultrasonic signals primarily associated with sonar systems having transmitting and receiving transducers all known in the art. The space parameter of the gram quantity is a quantity defined by one or two coordinates (bearing and sometimes elevation) necessary to uniquely define a point in a manner known in the art. The gram quantity is routed on signal path 18 to element extractors 20.

The element extractors 20 serve as a third stage for receiving the gram and extracting elements from the gram and features from the elements all of which are placed onto signal path 22.

The digital processor 10 further comprises a hierarchical world model 24 serving as a fourth stage and having knowledge supplied from a database defining predetermined elements, regions and features all of which are applied to signal path 26, which is routed to an inference engine 28 also receiving the elements and features from the element extractors on signal path 22.

The inference engine 28 serves as a fifth stage and derives conclusions based on a comparison between the supplied knowledge from the hierarchical world model 24 and the elements and features from the element extractors 20. The results derived by the inference engine 28 are placed on signal path 30, which is routed to both a display means (known in the art) that creates an auditory scene 32 and to the element extractors 20, both of the digital processor 10. The processing of beam-formed acoustic energy by the digital processor 10 is to be further described with reference to FIGS. 2–5. In particular, the processing of the beam-formed acoustic energy by the auditory peripheral model 16 may be further described with reference to FIG. 2 illustrating a plurality of program segments each having a particular reference number all given in Table 1.

TABLE 1

| REFERENCE NUMBER | PROGRAM SEGMENT |
|---|---|
| 34 | Short time auto-correlate the signal over time. |
| 36 | Short time average the magnitude square of the resulting signal. |
| 38 | Decimate the short-time average resulting signal along the time dimension. |
| 40 | Fast Fourier Transform (FFT) the decimated resulting signal along the time delay dimension with the result thereof serving as a gram. |

Figure 2:
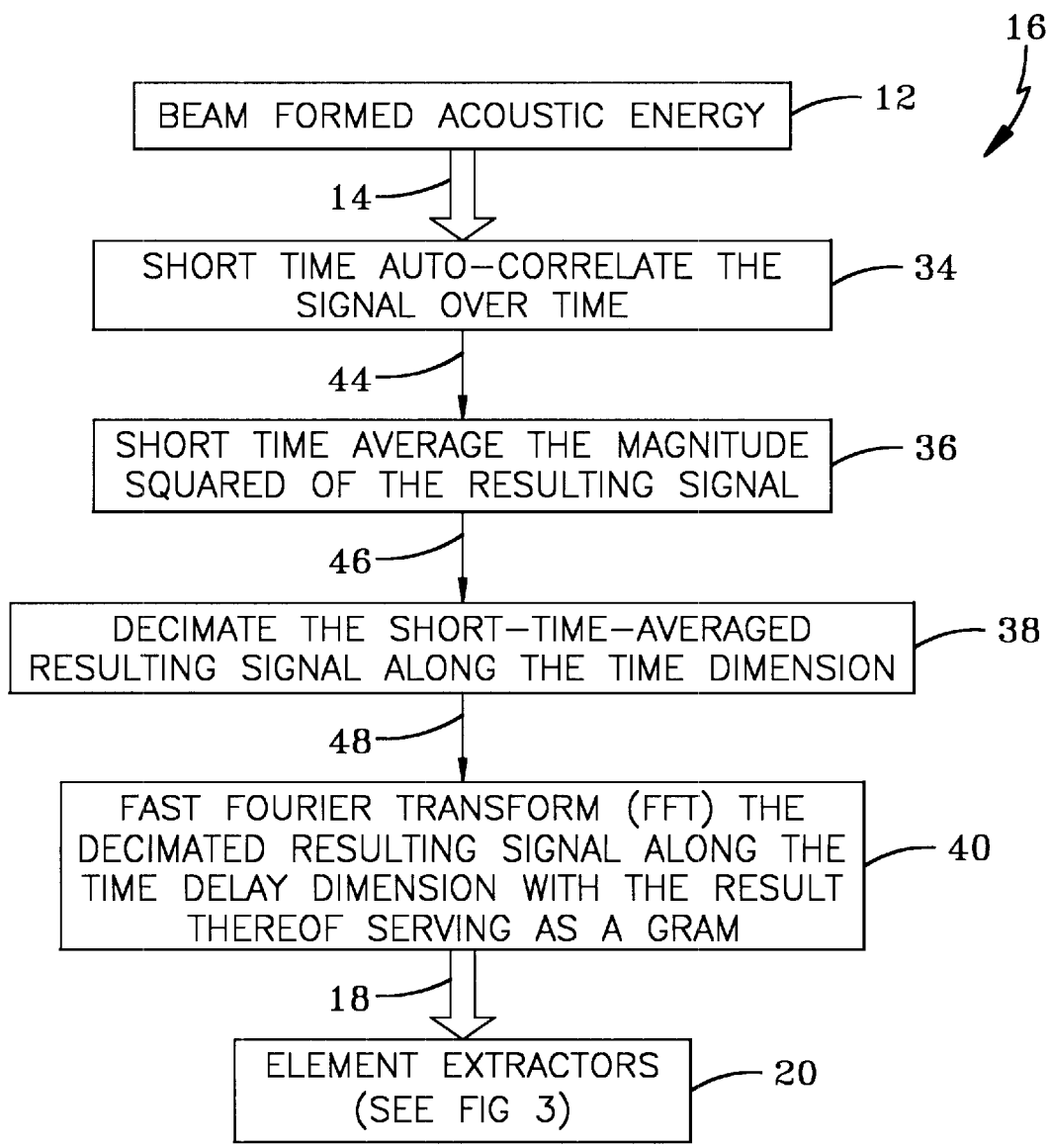
FIG. 2 is a flow chart of the auditory peripheral model of FIG. 1.

The auditory peripheral model 16, having the program segments shown in FIG. 2, receives the acoustic energy 14, which is routed to program segment 34.

The program 34 provides for a short time auto-correlation function of the beam-formed acoustic energy 14, sometimes referred to herein as a signal, over time. It is assumed herein that this signal is sampled with a sampling frequency $f_s$. As used herein a short term auto-correlation function is meant to represent computing for the signal X(t), t=1,2, . . . The program 34 operates in accordance with the following relationship:

$$R_x(t_1 \tau) = \begin{cases} x_{t-\frac{\tau}{2}} \cdot x_{t+\frac{\tau}{2}}, \text{ for } \tau \text{ even} \\ \dfrac{x_{t-\frac{\tau+1}{2}} \cdot x_{t+\frac{\tau-1}{2}} + x_{t-\frac{\tau-1}{2}} \cdot x_{t+\frac{\tau+1}{2}}}{2}, \end{cases} \quad (1)$$

for $\tau$ odd, $\tau = -n_d, -n_d + 1, \ldots n_d + 1$ where $n_d$ is an integer power of 2 typically about 32. The result of short time auto-correlation operations provides for a representation of the signal being processed in the terms of time and time delay. As used herein, the terms "time" and "time delay" are meant to represent the center times of the segments and the correlation variable. Upon completion of its operation, program segment 34 provides an output on signal path 44 that is routed to program segment 36.

Program segment 36 accepts the short time auto-correlated signal and then provides a running short-term average over $2n_d$ time samples for each time delay of the magnitude square of the components of the short time auto-correlated signal. The result of program segment 36 is applied on signal path 46, which is routed to program segment 38.

Program segment 38 receives the short time auto-correlated, magnitude-squared signal and decimates it over time for each time delay by a predetermined decimation factor $n_{dec}$. As used herein, decimation factor is an integer power of two usually about 16. The term decimate is meant to represent low pass filtering to eliminate frequencies above the sample frequency divided by twice the decimation factor ($f_s/2n_{dec}$) and then taking every decimation $n_{dec}$'th sample. The result of the operation of program segment 38 is applied on signal path 48, which is routed to program segment 40.

Figure 3:
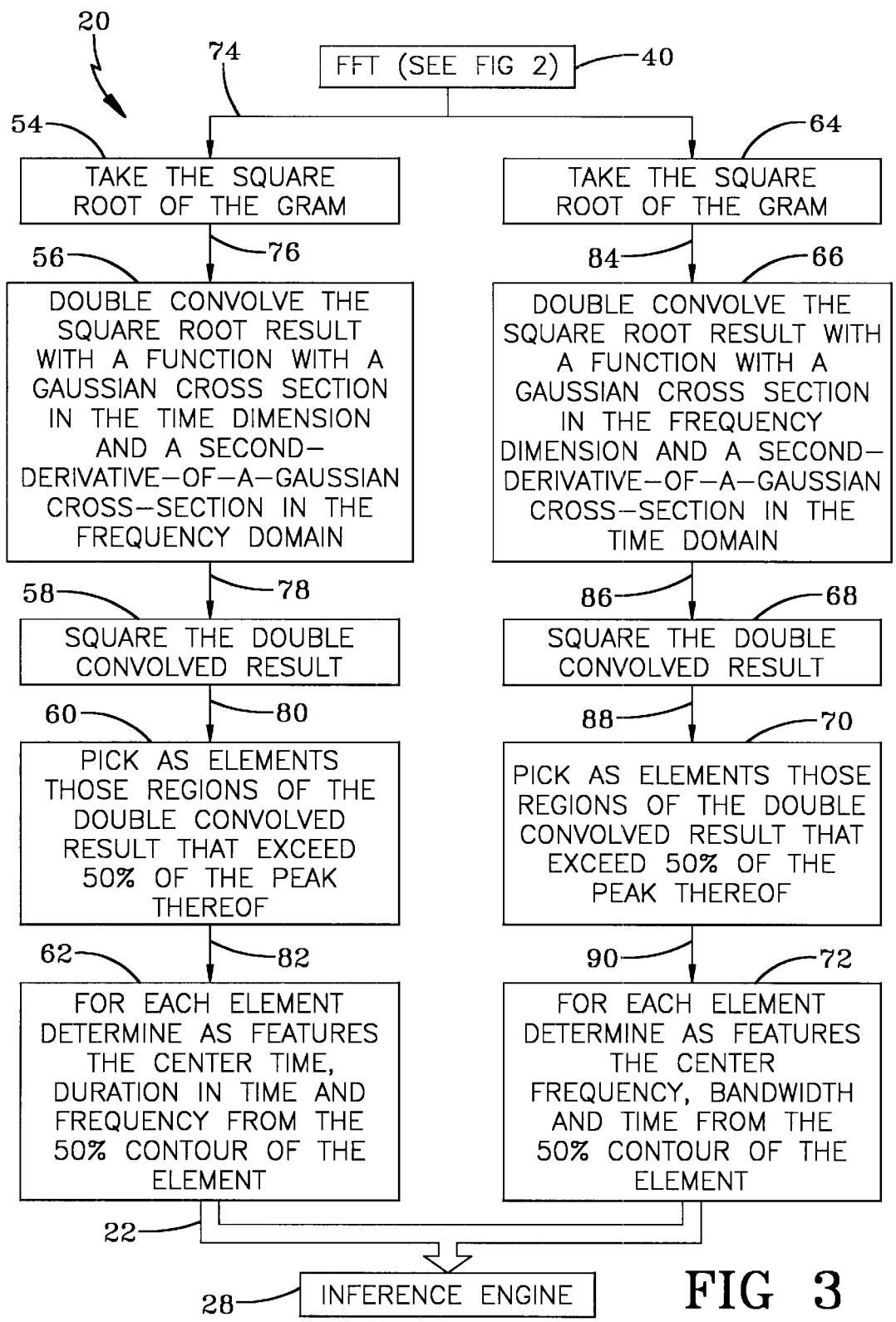
FIG. 3 is a flow chart of element extractors of FIG. 1.

Program segment 40 performs a Fast Fourier Transform (FFT) that breaks down a complex signal, such as, that received by program segment 40, into its elementary frequency components. The Fast Fourier Transform is performed along the time delay dimension for each time. More particularly, the Fast Fourier Transforms the received signal into its frequency components at each time to yield a representation in terms of time and frequency. The output of program segment 40 is applied to signal path 18 and serves as the gram which is routed to the element extractors 20, which may be further described with reference to FIG. 3, showing a plurality of program segments each having a reference number and all of which are given in Table 2.

TABLE 2

| REFERENCE NUMBER | PROGRAM SEGMENT |
|---|---|
| 52 | Gram |
| 54 | Take the square root of the gram. |
| 56 | Double convolve the square root result with a function with a Gaussian cross- section in the time dimension and a second-derivative-of-a-Gaussian cross-section in the frequency domain. |
| 58 | Square the double convolved result. |
| 60 | Pick as elements those regions of the double convolved result that exceed 50% of the peak thereof, |
| 62 | For each element determine as features the center time, a duration in time and frequency from the 50% contour of the element. |
| 64 | Take the square root of the gram. |
| 66 | Double convolve the square root result with a function with a Gaussian cross-section in the frequency dimension and a second-derivative-of-a-Gaussian cross-section in the time domain. |
| 68 | Square the double convolved result. |
| 70 | Pick as elements those regions of the double convolved result that exceed 50% of the peak thereof. |

TABLE 2-continued

| REFERENCE NUMBER | PROGRAM SEGMENT |
|---|---|
| 72 | For each element determine as features the center frequency, bandwidth and time from the 50% contour of the element. |

Figure 4:
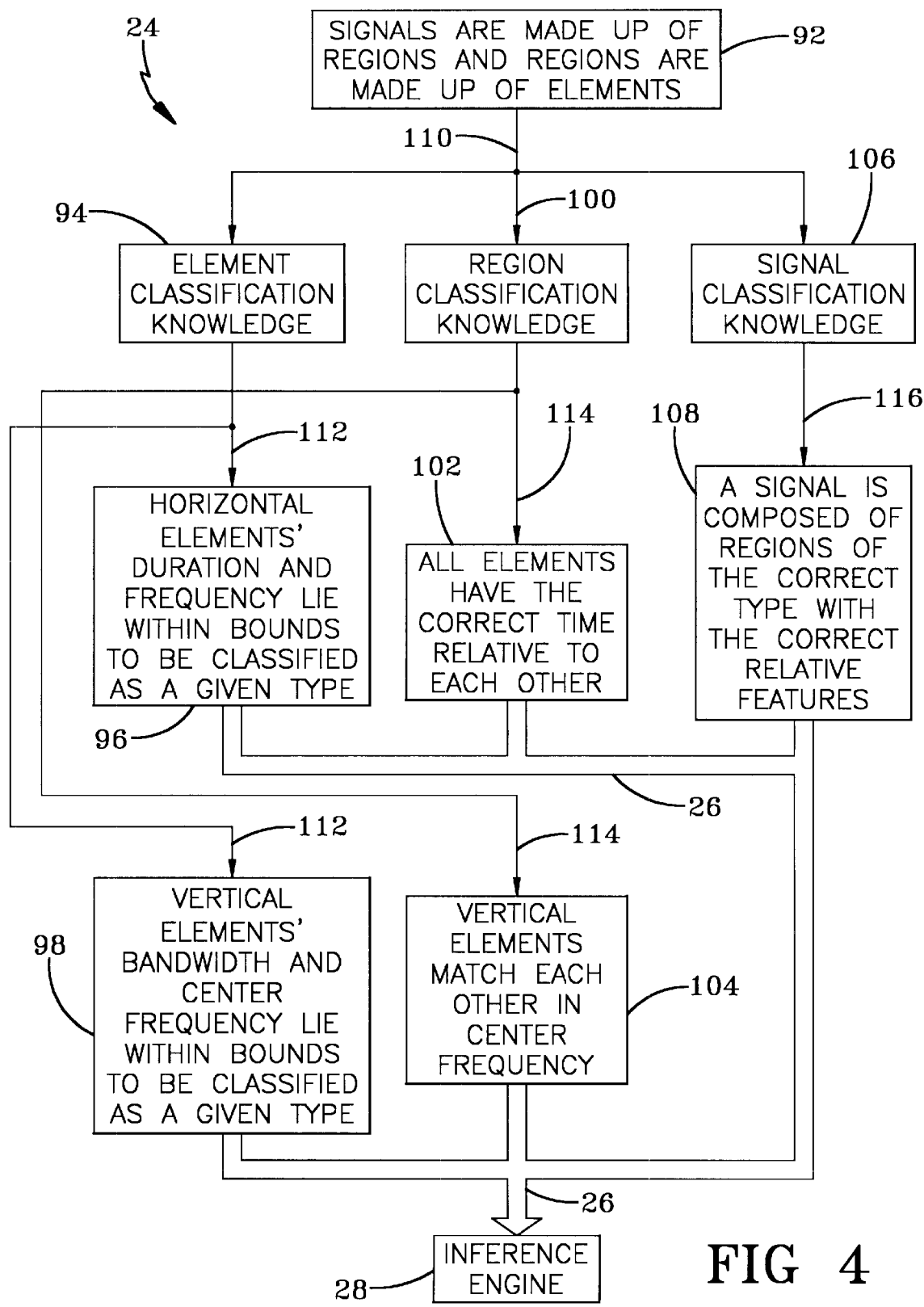
FIG. 4 is a flow chart of the hierarchical world model of FIG. 1.
Figure 5:
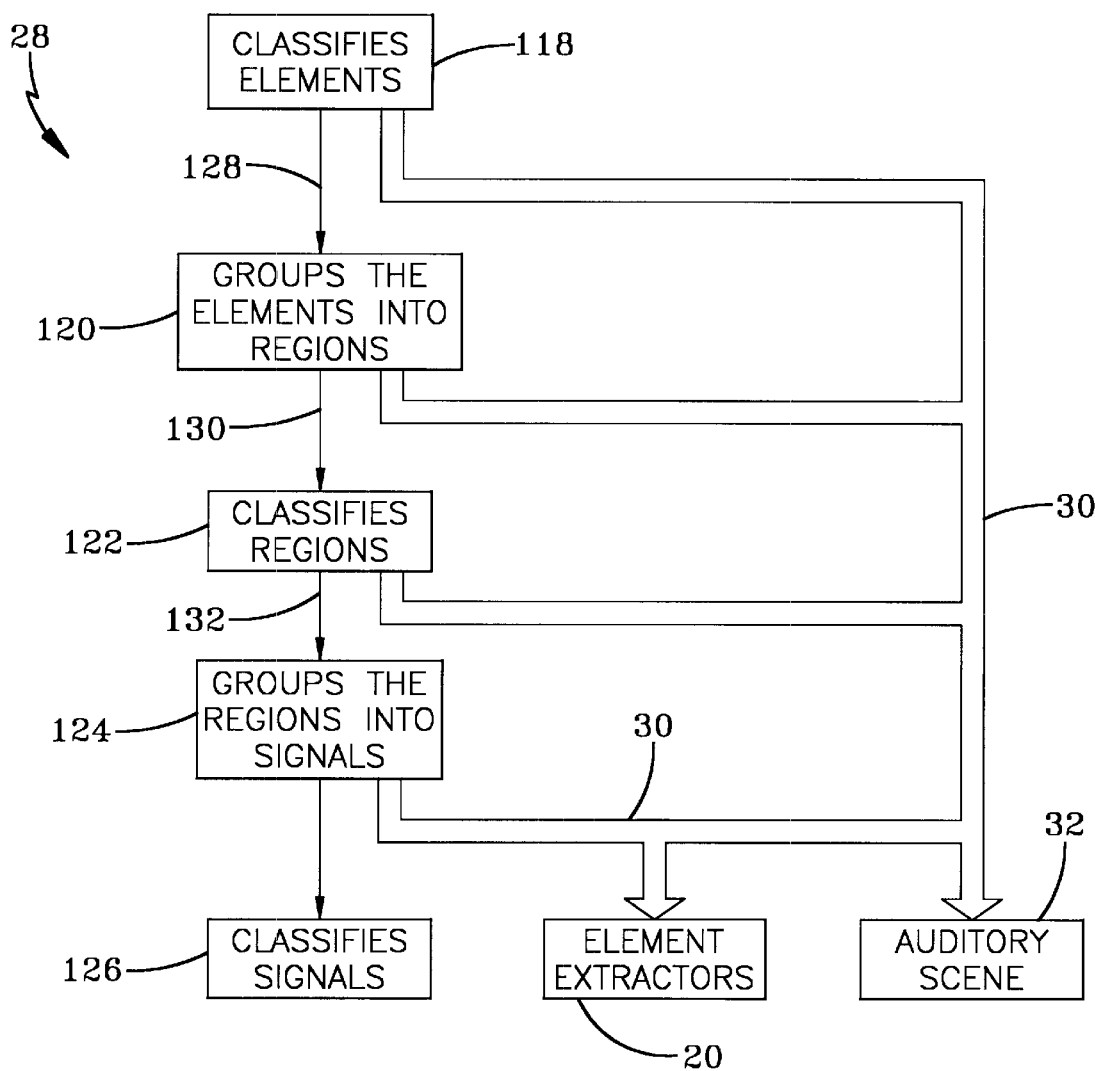
FIG. 5 is a flow chart of the inference engine of FIG. 1.

The element extractors 20 having flow chart of FIGS. 3–5 extracts elements from the gram as well as important features from the elements. The extracted elements are defined herein as a contigous area in time and frequency of acoustic energy. The extracted elements comprise horizontal and vertical elements, wherein the horizontal elements are extracted by program segments 54–62, and the vertical elements are extracted by program segments 64–72.

Program segment 54 takes the square root of the components of gram 52 received from the Fast Fourier Transform step 40 of FIG. 2 by way of signal path 74. The output of program segment 54 is routed to program segment 56 by way of signal path 76.

Program segment 56 performs a double convolution on its received square root result with a function F(t,f) having a Gaussian cross-section in time dimension and a second-derivative-of-a-Gaussian cross-section in the frequency domain:

$$F(t, f) = \left( \frac{1}{\sqrt{2\pi} \, \sigma_t} e^{-\frac{t^2}{2\sigma_t^2}} \right) \cdot \left( \frac{f^2 - \sigma_f^2}{\sqrt{2\pi} \, \sigma_f^5} e^{-\frac{f^2}{2\sigma_f^2}} \right) \quad (2)$$

where $\sigma_t$ is typically about 0.065 ms. and $\sigma_f$ is typically about 66 hz. The output of program segment 56 is routed to program segment 58 by way of signal path 78.

The program segment 58 performs a squaring operation on the double convoluted quantity received from program segment 56 and routes the result thereof, by way of signal path 80, to program segment 60.

The program segment 60 performs a picking and choosing process where the components of those regions of the squared-double convoluted result that exceed 50% of the peak value thereof are chosen. Actual absolute values are essentially meaningless. Only relative values, such as, 50% of the maximum have any meaning. Each of the picked elements derived by program segment 60 are routed, via signal path 82, to program segment 62.

The program segment 62 examines each of its received elements and determines their features which for the horizontal elements comprise its center time, with its duration in time, and its frequency, all of which are related to the 50% contour defining each horizontal element. More particularly, the center time is a representation of the average of the earliest and latest time values on the 50% contour and has typical values in the range of 0 to 5 seconds, the duration in time is a representation of the difference between the latest and earliest time values on the 50% contour and has typical values of 0.1 to 0.5 seconds and the frequency is a representation of the average of the smallest and largest frequency values on the 50% contour and has typical values in the range of 0 to 6000 Hz. The horizontal elements are routed to the inference engine 28 by way of signal path 26.

The extraction of the vertical elements performed by element extractors 20 is accomplished by program segments 64–72 each of which operate in a manner similar to program segments 54–62 respectively, except that program segment 66 performs a double convolution on its received square root result with a function F' (t,f) having a second-derivative-of-a-Gaussian cross-section in the time dimension and a Gaussian cross-section in the frequency domain:

$$F'(t, f) = \left( \frac{f^2 - \sigma_t'^2}{\sqrt{2\pi} \, \sigma_t'^5} e^{-\frac{f^2}{2\sigma_t'^2}} \right) \cdot \left( \frac{1}{\sqrt{2\pi} \, \sigma_{ft}'} e^{-\frac{f^2}{2\sigma_t'^2}} \right) \quad (3)$$

where $\sigma'_t$ is typically about 0.025 ms. and $\sigma'_f$ is typically about 660 hz, rather than the function used by program segment 56. Further, the program segment 72 extracts features of vertical elements comprising its center frequency, its bandwidth and its time from the 50% contour defining each vertical element, which is unlike the center time, duration in time and frequency features of the horizontal elements associated with program segment 62. The center frequency is representative of the average of the smallest and largest frequency values on the 50% contour and has typical values in the range of 0 to 6000 Hz, the bandwidth is representative of the difference between the highest and lowest frequency values on the 50% contour and has typical values in the range of 1000 to 3000 Hz, and the time is representative of the average of the earliest and latest time values on the 50% contour and has typical values in the range of 0 to 5 seconds. The output of program segment 72 is routed, via signal path 26, to the inference engine 28. The inference engine 28 also receives supplied knowledge from the hierarchical world model 24, which may be further described with reference to FIG. 4 showing a plurality of program elements each having a designated reference number and all of which are shown in Table 3.

TABLE 3

| REFERENCE NUMBER | PROGRAMS |
|---|---|
| 92 | Signals are made up of regions and regions are made up of elements. |
| 94 | Element Classification Knowledge |
| 96 | Horizontal elements' duration and frequency lie within bounds to be classified as a given type. |
| 98 | Vertical elements' bandwidth and center frequency lie within bounds to be classified as a given type. |
| 100 | Region Classification Knowledge |
| 102 | All elements have the correct time relative to each other. |
| 104 | Vertical elements match each other in center frequency. |
| 106 | Signal Classification Knowledge |
| 108 | A signal is composed of regions of the correct type with the correct relative features. |

The hierarchical world model 24 contains knowledge about the environment existing throughout the undersea world. This knowledge is primarily utilized in sonar applications, such which sources of sound are associated with which vessels and what the characteristics of the sound emitted by these sources are. This knowledge consists of knowledge about signals, which are shown in program segment 92 as being made up of regions and regions being made up of elements. The signals are classified by three operations which are element classification 94, region classification 100, and signal classification 106, all of which receive their associated information from program segment 92 by way of signal path 110.

The element classification 94 operation is comprised of program segments 96 and 98, both of which are interconnected to each other by way of signal path 112 which is the output of program segment 94.

Program segment 96 specifies the parameter wherein all the horizontal elements' duration and frequency lie within a predetermined boundary, such as, its duration must be between 0.2 and 0.4 seconds and its frequency must be between 2500 and 4000 Hz so as to be classified as a particular, predetermined, correct or given type. Defining the horizontal element into a given type provides knowledge that can be used to classify the region that contains the element.

Program segment 98 is an element classification operation, wherein the vertical elements' bandwidth and center frequency lie within a predetermined boundary, such as, its bandwidth must be between 1500 and 2000 Hz and its center frequency must be between 3500 to 4500 Hz so as to be classified as a particular, predetermined, correct or given type. Defining the vertical element into a given type provides knowledge that can be used to classify the region that contains the element. The output of program segment 98, as well as program segment 96, is applied to signal path 26 which is routed to the inference engine 28.

The program segment 100, which defines region classification knowledge is comprised of program segments 102 and 104 both of which are interconnected by signal path 114, which is the output of program segment 100.

Program segment 102 specifies a characteristic wherein all of the elements, including the horizontal and vertical elements, must be of the right type and have a correct time relative to each other. For example, the first element must be a vertical element of type VE1 and the next two elements must be horizontal elements of type HE5 and their middle times must be between 1.5 and 1.75 seconds after the time of the first element.

Program segment 104 specifies that the vertical 15 elements match each other within their center frequency which, as previously described with reference to FIG. 3 is a feature of the vertical element. The output of program segment 104, as well as program segment 102, is routed to the inference engine 28 by way of signal path 26.

Program segment 106 provides for signal classification knowledge and interacts with program segment 108, which is interconnected thereto by way of signal path 116.

Program segment 108 specifies a characteristic, wherein a signal is composed of regions of the correct type with correct relative features. For example, the first region must be of type R1 and the second region must be of type R2 and must occur between 1 and 1.5 seconds after the first. The output of program segment 108 is routed to the inference engine 28 by way of signal path 26. The inference engine 28 may be further described with reference to FIG. 5, which illustrates a plurality of elements each having a reference number and all of which are given in Table 4.

TABLE 4

| REFERENCE NUMBER | PROGRAM SEGMENT |
|---|---|
| 118 | Classifies Elements |
| 120 | Groups the elements into regions. |
| 122 | Classifies Regions |
| 124 | Groups the Regions into signals |
| 126 | Classifies signals |

The inference engine 28 serves as a processing program in the digital signal process 110 and derives a conclusion from the facts and rules continued in its knowledge base using various known techniques. The inference engine 28 uses knowledge from the database of the hierarchical world model 24 to build up an auditory scene 32 out of the received information. Furthermore, based upon what it believes to be present in the auditory scene 32, the inference engine 28 may modify the procedures used by the element extractors 20.

The inference engine 28, in essence, classifies elements (shown by program segment 118), groups the elements into regions (shown by program segment 120), classifies the regions (shown by program segment 122), groups the regions into signals (shown by program segment 124), and classifies the signals (shown by program segment 126). The program segments 118 and 120, are interconnected by signal path 128, program segments 120 and 122 are interconnected by program segment 130, program segments 122 and 124 are interconnected by signal path 132, and program segments 124 and 126 are interconnected by program segment 134. The inference engine 28 derives its conclusion based upon a comparison between the supplied knowledge received from the hierarchical world model 24 by way of signal path 26 and the elements and features received from the element extractors 20 by way of signal path 22. More particularly, for example, to derive a conclusion, the inference engine 28 first looks at the features of the elements as they are provided by the element extractors 20 and compares them to element features associated with various element types in the hierarchical world model 24 and assigns the elements classifications based upon match in features. As it classifies elements, it groups them into regions and extracts features of the regions and so on.

It should now be appreciated that the practice of the present invention provides for a digital processor which automates the sorting of the necessary elements to provide for a auditory scene which indicates the identification of the acoustic energy and the location thereof so as to lessen the burden placed on the sonar operator.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. A digital processor for analyzing acoustic energy to determine the identification of the acoustic energy and the location of the source of acoustic energy, said digital processor comprising:

a first stage for receiving acoustic energy;

a second stage for transforming said acoustic energy into a gram which is representative of the acoustic energy and has time-frequency-space parameters;

a third stage for receiving said gram and extracting elements from said gram and features from said elements;

a fourth stage having knowledge supplied from a database defining predetermined elements, regions and features; and a fifth stage that receives the elements and features of said third stage and the supplied knowledge of said fourth stage and derives conclusions based on a comparison between said supplied knowledge and said elements and features.

2. The digital processor according to claim 1 wherein said second stage for transforming comprises;
   means for short time auto-correlating the acoustic energy over a predetermined time period;
   means for short time averaging the magnitude square of the short-timed auto-correlated acoustic energy;
   means for decimating the short time averaged acoustic energy along a time dimension; and
   means for performing a Fast Fourier Transform (FFT) of said decimated acoustic energy along the time delay dimension with the result thereof serving as said gram.

3. The digital processor according to claim 1 wherein said extracted elements comprise horizontal and vertical elements.

4. The digital processor according to claim 3 wherein said horizontal elements are extracted by means comprising;
   means for taking the square root of the gram;
   means for performing double convolution on the square rooted result with a function with a Gaussian cross-section in the time dimension and a second-derivative-of-a-Gaussian cross-section in the frequency domain;
   means for performing a squaring operation on said double-convolved result;
   means for picking as elements those regions of the double-convolved result that exceed 50% of the peak thereof; and
   means for determining each element as having features comprising a center time, duration in time and a frequency with each feature being derived from the 50% contour of each respective element.

5. The digital processor according to claim 3 wherein said vertical elements are extracted by means comprising:
   means for taking the square root of the gram;
   means for performing a double convolution on the square rooted result with a function with a Gaussian cross-section in the time dimension and a second-derivative-of-a-Gaussian cross-section in the time domain;
   means for performing a squaring operation on said squared double-convolved result;
   means for picking as elements those regions of said squared double-convolved result that exceed 50% of the peak thereof; and
   means for determining each element as having features comprising a center frequency, a bandwidth and a time with each feature being derived from the 50% contour of each respective element.

6. The digital processor according to claim 1 wherein said database comprises signals that are made up of regions and regions that are made up of elements.

7. The digital processor according to claim 6 wherein each signal is composed of regions of predetermined types having predetermined relative features.

8. The digital processor according to claim 1 wherein said database comprises horizontal elements whose duration and frequency lie within predetermined bounds so as to be classified as being a given type.

9. The digital processor according to claim 1 wherein said database comprises vertical elements whose bandwidth and center frequency lie within predetermined bounds so as to be classified as being a given type.

10. The digital processor according to claim 1 wherein said database comprises elements all of which have predetermined times relative to each other.

11. The digital processor according to claim 10 wherein said elements comprise vertical elements all of which match each other in their center frequency characteristic.

12. The digital processor according to claim 1 wherein said forth stage comprises means for classifying elements, means for grouping said elements into regions, and means for classifying regions.

13. A method for analyzing acoustic energy to determine the identification of the acoustic energy and the location of the source of acoustic energy, said method comprising the steps of:
   receiving acoustic energy;
   transforming said acoustic energy into a gram which is representative of the acoustic energy and has time-frequency-space parameters;
   receiving said gram and extracting elements from said gram and features from said elements;
   supplying knowledge from a database defining predetermined elements, regions and features; and
   receiving said elements and said features and the supplied knowledge and deriving conclusions based on a comparison between said supplied knowledge and said elements and said features.

14. The method according to claim 13 wherein transforming step comprises;
   short time auto-correlating said acoustic energy over a predetermined time period;
   short time averaging the magnitude square of said short-timed auto-correlated acoustic energy;
   decimating said short-time averaged acoustic energy along a predetermined time dimension; and
   performing a Fast Fourier Transform (FFT) of the decimated acoustic energy, along said time delay dimension with the result thereof serving as said gram.

15. The method according to claim 13 wherein said extracted elements comprise horizontal and vertical elements.

16. The method according to claim 15 wherein said horizontal elements are extracted by the steps comprising;
   taking the square root of said gram;
   performing a double convolution on said square rooted result with a function having a Gaussian cross-section in the time dimension and a second-derivative-of-a-Gaussian cross-section in the frequency domain;
   performing a squaring operation on double-convolved result; and
   picking as elements those regions of said squared double-convolved result that exceed 50% of the peak value thereof; and determining each element a having features comprising a center time, a duration in time and a frequency with each feature being derived from the 50% contour of each respective element.

17. The method according to claim 15 wherein said vertical elements are extracted by the steps comprising:
   taking the square root of said gram;
   performing a double convolution on said square rooted result with a function having a Gaussian cross-section in the time dimension and a second-derivative-of-a-Gaussian cross-section in the time domain;
   performing a squaring operation on said double-convolved result;

picking as elements those regions of said double-convolved result that exceed 50% of the peak value thereof; and determining each element as having features comprising a center frequency, a bandwidth and a time with each feature being derived from the 50% contour of each respective element.

18. The method according to claim 13 wherein said database comprises signals that are made up of regions and regions that are made up of elements.

19. The method according to claim 18 wherein each signal is composed of regions of predetermined types having predetermined relative features.

20. The method according to claim 13 wherein said database comprises horizontal elements whose duration and frequency lie within predetermined bounds so as to be classified as being a given type.

21. The method according to claim 13 wherein said database comprises vertical elements whose bandwidth and center frequency lie within predetermined bounds so as to be classified as being a given type.

22. The method according to claim 13 wherein said database comprises elements all of which have predetermined times relative to each other.

23. The method according to claim 22 wherein said elements comprise vertical elements all of which match each other in their center frequency characteristic.

24. The method according to claim 13 wherein said comparison step comprises the steps of classifying elements, grouping the elements into regions, and classifying regions.

* * * * *